United States Patent
Kubota et al.

(10) Patent No.: US 6,960,814 B2
(45) Date of Patent: Nov. 1, 2005

(54) REFLECTING DEVICE AND METHOD OF FABRICATING THE SAME

(75) Inventors: Kazuyoshi Kubota, Kyoto (JP); Pablo O. Vaccaro, Kyoto (JP); Tahito Aida, Kyoto (JP)

(73) Assignee: ATR Advanced Telecommunications Research Institute International, Kyoto (JP)

( * ) Notice: Subject to any disclaimer, the term of this patent is extended or adjusted under 35 U.S.C. 154(b) by 220 days.

(21) Appl. No.: 10/361,854

(22) Filed: Feb. 11, 2003

(65) Prior Publication Data

US 2003/0174291 A1 Sep. 18, 2003

(30) Foreign Application Priority Data

Feb. 13, 2002 (JP) .............................. 2002-035994

(51) Int. Cl.[7] ............................................ H01L 29/82
(52) U.S. Cl. ................. 257/415; 257/418; 257/419; 257/420; 257/432; 257/436; 257/80; 257/81; 257/18
(58) Field of Search ................. 257/190, 191, 257/192, 194, 627, 628, 622, 631, 103, 18, 257/80, 81, 418, 419, 420, 432, 436

(56) References Cited

U.S. PATENT DOCUMENTS

| | | |
|---|---|---|
| 4,830,984 A | 5/1989 | Purdes |
| 5,613,022 A | 3/1997 | Odhner et al. |
| 5,855,998 A | 1/1999 | Tanabe et al. |
| 6,051,063 A | 4/2000 | Tanabe et al. |
| 6,221,739 B1 | 4/2001 | Gorelik |
| 6,534,838 B1 | 3/2003 | Vaccaro |
| 6,646,364 B1 | 11/2003 | Horning et al. |
| 2003/0173583 A1 * | 9/2003 | Kubota et al. .............. 257/190 |

FOREIGN PATENT DOCUMENTS

JP 08-114408 5/1996

* cited by examiner

Primary Examiner—Nathan J. Flynn
Assistant Examiner—Fazli Erdem
(74) Attorney, Agent, or Firm—Westerman, Hattori, Daniels & Adrian, LLP

(57) ABSTRACT

Reflecting layers in first, second and third regions are separated from a reflecting layer in the surrounding region by a separating groove. The first region is folded in a valley shape from a substrate at a groove, the first region and the second region are folded in a valley shape at a groove, the third region is folded in a valley shape from the substrate at a groove, and the second region and the third region are folded in a mountain shape by a line.

9 Claims, 10 Drawing Sheets

REFLECTING DEVICE AND METHOD OF FABRICATING THE SAME

BACKGROUND OF THE INVENTION

1. Field of the Invention

The present invention relates to a reflecting device constructed by a combination of three reflecting layers and a method of fabricating the same.

2. Description of the Background Art

Conventionally, reflecting mirror devices having three plane mirrors arranged therein at right angles to one another have been known. Such reflecting mirror devices can reflect light incident from an arbitrary direction to a direction parallel to the incident direction, and are referred to as retroreflectors. The conventional retroreflectors are of large sizes in construction.

Meanwhile, micro-optical benches having a standing structure are realized by micromachining techniques using silicon. It has been reported that resonance microscanners for laser scanning displays, movable microreflectors, and scanning micromirrors for external resonators of semiconductor lasers, for example, are fabricated using the micromachining techniques.

In the conventional micromachining techniques, after parts of stacked semiconductor layers are stripped by etching, the stripped parts are slid to stand, and are joined at a hinge, thereby forming a standing structure. Mirrors or the like standing at predetermined angles are constructed on a substrate using the standing structure. It is considered that the above-mentioned retroreflectors are fabricated using such micromachining techniques.

When the standing structure is fabricated by semiconductors using the conventional micromachining techniques, wear occurs in sliding the stripped semiconductor layers. Further, it is difficult to accurately slide the semiconductor layers to a predetermined position. Therefore, it is difficult to accurately control the angle and the position of each of members constituting the standing structure, and the workability is inferior. Consequently, it is difficult to fabricate retroreflectors using the conventional micromachining techniques.

SUMMARY OF THE INVENTION

An object of the present invention is to provide a reflecting device that can be obtained by accurately combining three reflecting layers at predetermined angles, and can be miniaturized and can be easily fabricated.

Another object of the present invention is to provide a method of fabricating a reflecting device that can be obtained by accurately combining three reflecting layers at predetermined angles, and can be miniaturized and can be easily fabricated.

A reflecting device according to an aspect of the present invention comprises a substrate; a first layer; a second layer; and a third layer in this order, the second layer comprising a stacked structure of a plurality of semiconductor layers having different lattice constants respectively, the third layer comprising a reflecting layer, the third layer having a first line, a second line, a third line and a fourth line which meet at first, second and third angles in this order at a predetermined point, and including a first region having two sides along the first line and the second line, a second region having two sides along the second line and the third line, and a third region having two sides along the third line and the fourth line, a separating groove having a depth reaching the first layer from the third layer so as to surround the first, second and third regions in a portion excluding the first, second, third and fourth lines, and the first layer in the first, second and third regions being selectively removed, the second layer being folded in a valley shape at the first, second and fourth lines and folded in a mountain shape at the third line by a strain exerted in the second layer, the first region and second regions standing on the third layer on the substrate, the third region facing the third layer on the substrate, and the first and second regions making a predetermined angle with each other.

In the reflecting device according to the present invention, the third layer, the second layer and the first layer are removed at the separating groove surrounding the first, second and third regions in the portion excluding the first, second, third and fourth lines, and the first layer in the first, second and third regions is removed. Accordingly, the second layer in the first, second and third regions enters a released state while being linked to the surrounding region only at the first and fourth lines.

Since the respective lattice constants of the plurality of semiconductor layers in the second layer differ from one another, a strain due to the difference in the lattice constant is induced in the second layer. Consequently, the second layer is folded in a valley shape at the first line, the second line and the fourth line and is folded in a mountain shape at the third line so as to relieve the strain. Consequently, the first region and the second region stand on the third layer on the substrate, the third region faces the third layer on the substrate, and the first region and the second region make a predetermined angle with each other.

The third layer in the first region, the third layer in the second region and the third layer on the substrate thus make predetermined angles with one another while being related to one another. Accordingly, the positional relationship among the three reflecting layers is strictly defined. Further, the second layer is automatically folded so as to relieve the strain caused by the difference in the lattice constant among the plurality of semiconductor layers. Therefore, it is possible to easily fabricate a small-sized reflecting device comprising three reflecting layers in a simple process.

It is preferable that the first angle is 90 degrees, the second angle is 90 degrees, and the third angle is 45 degrees.

In this case, the third layer in the first region and the third layer in the second region stand perpendicularly to the third layer on the substrate, and the third layer in the first region and the third layer in the second region make right angles with each other. Consequently, a reflecting device comprising three reflecting layers making right angles with one another is realized. By the reflecting device, light incident from an arbitrary direction can be reflected to a direction parallel to the incident direction.

The third layer may be removed at the first, second and fourth lines. Consequently, the second layer can be easily folded in a valley shape at the first, second and fourth lines.

The second layer may comprise a first semiconductor layer having a first lattice constant and a second semiconductor layer having a second lattice constant smaller than the first lattice constant. In this case, the second layer is folded in a valley shape at the first, second and fourth lines so as to relieve the strain caused by the difference between the first lattice constant of the first semiconductor layer and the second lattice constant of the second semiconductor layer.

The first layer, the second layer and the third layer may be intermittently removed at the third line. In this case, the second layer can be easily folded in a mountain shape at the third line utilizing a force acting when the second layer is folded in a valley shape at the first, second and fourth lines.

The second layer may comprise a first semiconductor layer having a first lattice constant, a second semiconductor layer having a second lattice constant smaller than the first lattice constant, and a third semiconductor layer having a third lattice constant larger than the second lattice constant. The third layer at the first, second and fourth lines and the third semiconductor layer may be removed such that the second layer is folded in a valley shape at the first, second and fourth lines, and the third layer may be removed at the third line such that the second layer is folded in a mountain shape at the third line.

In this case, when the third layer at the first, second and fourth lines and the third semiconductor layer are removed, the second layer is folded in a valley shape at the first, second and fourth lines so as to relieve the strain caused by the difference between the first lattice constant of the first semiconductor layer and the second lattice constant of the second semiconductor layer. Further, when the third layer is removed at the third line, the second layer is folded in a mountain shape at the third line so as to relieve the strain caused by the difference between the third lattice constant of the third semiconductor layer and the second lattice constant of the second semiconductor layer.

The first layer, the second layer and the third layer may be removed at the predetermined point. Consequently, a stress concentrated at an intersection of the first, second, third and fourth lines is relieved as the second layer in the first, second and third regions is folded.

The reflecting device may further comprise a driving part for changing the respective angles of the first region and the second region which stand on the third layer on the substrate.

In this case, the angles among the three reflecting layers can be arbitrarily changed. Consequently, it is possible to modulate and reflect the incident light.

The driving part may exert an electrostatic force or an electromagnetic force between the third region and the third layer on the substrate.

In this case, the angles among the three reflecting layers can be easily changed by changing the electrostatic force or the electromagnetic force which is exerted between the third region and the third layer on the substrate.

A method of fabricating a reflecting device according to another aspect of the present invention comprises the steps of forming a first layer on a substrate; forming on the first layer a second layer comprising a stacked structure of a plurality of semiconductor layers having different lattice constants respectively; forming on the second layer a third layer comprising a reflecting layer; forming on the third layer a first line, a second line, a third line and a fourth line which meet at first, second and third angles in this order at a predetermined point, to provide a first region having two sides along the first line and the second line, a second region having two sides along the second line and the third line, and a third region having two sides along the third line and the fourth line; forming a separating groove having a depth leading to the first layer from the third layer so as to surround the first, second and third regions in a portion excluding the first, second, third and fourth lines; and removing selectively the first layer in the first, second and third regions, to fold the second layer in a valley shape at the first, second line and fourth lines and fold the second layer in a mountain shape at the third line by a strain exerted in the second layer, cause the first and second regions to stand on the third layer on the substrate, face the third region to the third layer on the substrate, and cause the first and second regions to make a predetermined angle with each other.

In the method of fabricating the reflecting device according to the present invention, the third layer, the second layer and the first layer are removed at the separating groove surrounding the first, second and third regions in the portion excluding the first, second, third and fourth lines, and the first layer in the first, second and third regions is removed. Accordingly, the second layer in the first, second and third regions enters a released state while being linked to the surrounding region only at the first and fourth lines.

Since the respective lattice constants of the plurality of semiconductor layers in the second layer differ from one another, the strain due to the difference in the lattice constant is induced in the second layer. Consequently, the second layer is folded in a valley shape at the first line, the second line and the fourth line and is folded in a mountain shape at the third line so as to relieve the strain. Consequently, the first region and the second region stand on the third layer on the substrate, the third region faces the third layer on the substrate, and the first region and the second region make a predetermined angle with each other.

The third layer in the first region, the third layer in the second region, and the third layer on the substrate thus make predetermined angles with one another while being related to one another. Accordingly, the positional relationship among the three reflecting layers is strictly defined. Further, the second layer is automatically folded so as to relieve the strain caused by the difference in the lattice constant among the plurality of semiconductor layers. Therefore, it is possible to easily fabricate a small-sized reflecting device comprising three reflecting layers in a simple process.

The step of forming the first line, the second line, the third line and the fourth line may comprise the step of forming on the third layer a first line, a second line, a third line and a fourth line which meet at a first angle of 90 degrees, a second angle of 90 degrees and a third angle of 45 degrees in this order at the predetermined point.

In this case, the third layer in the first region and the third layer in the second region stand perpendicularly to the third layer on the substrate, and the third layer in the first region and the third layer in the second region make right angles with each other. Consequently, a reflecting device comprising three reflecting layers making right angles with one another is realized. By the reflecting device, light incident from an arbitrary direction can be reflected to a direction parallel to the incident direction.

The fabricating method may further comprise the step of removing the third layer at the first, second and fourth lines.

Consequently, the second layer can be easily folded in a valley shape at the first, second and fourth lines.

The step of forming the second layer may comprise the step of forming a second layer comprising a first semiconductor layer having a first lattice constant and a second semiconductor layer having a second lattice constant smaller than the first lattice constant.

In this case, the second layer is folded in a valley shape at the first, second and fourth lines so as to relieve the strain caused by the difference between the first lattice constant of the first semiconductor layer and the second lattice constant of the second semiconductor layer.

The fabricating method may further comprise the step of intermittently removing the first layer, the second layer and the third layer at the third line.

In this case, the second layer can be easily folded in a mountain shape at the third line by utilizing a force acting when the second layer is folded in a valley shape at the first, second and fourth lines.

The step of forming the second layer may comprise the step of forming a second layer comprising a first semiconductor layer having a first lattice constant, a second semiconductor layer having a second lattice constant smaller than the first lattice constant, and a third semiconductor layer having a third lattice constant larger than the second lattice constant. The fabricating method may further comprise the step of removing the third layer at the first, second and fourth lines and the third semiconductor layer such that the second layer is folded in a valley shape at the first, second and fourth lines, and removing the third layer at the third line such that the second layer is folded in a mountain shape at the third line.

In this case, when the third layer at the first, second and fourth lines and the third semiconductor layer are removed, the second layer is folded in a valley shape at the first, second and fourth lines so as to relieve the strain caused by the difference between the first lattice constant of the first semiconductor layer and the second lattice constant of the second semiconductor layer. Further, when the third layer is removed at the third line, the second layer is folded in a mountain shape at the third line so as to relieve the strain caused by the difference between the third lattice constant of the third semiconductor layer and the second lattice constant of the second semiconductor layer.

The fabricating method may further comprise the step of removing the first layer, the second layer and the third layer at the predetermined point.

Consequently, a stress concentrated at an intersection of the first, second, third and fourth lines is relieved as the second layer in the first, second and third regions is folded.

The fabricating method may further comprise the step of providing a driving part for changing the respective angles of the first region and the second region which stand on the third layer on the substrate.

In this case, the angles among the three reflecting layers can be arbitrarily changed. Consequently, incident light can be modulated and reflected.

The step of providing the driving part may comprise the step of providing a driving force generation part for exerting a driving force which is an electrostatic force or an electromagnetic force between the third region and the third layer on the substrate.

In this case, the angles among the three reflecting layers can be easily changed by changing the electrostatic force or the electromagnetic force exerted between the third region and the third layer on the substrate.

A semiconductor device according to still another aspect of the present invention comprises a first layer; a second layer; and a third layer in this order, the second layer comprising a stacked structure of a plurality of semiconductor layers having different lattice constants respectively, a separating groove having a depth reaching to the first layer from the third layer being formed so as to partially surround a predetermined region, and the first layer in the predetermined region being selectively removed, and a groove having a first depth being formed at a first line such that the second layer is folded in a valley shape at the first line by a strain exerted in the second layer in the predetermined region, and a groove having a second depth different from the first depth being formed at a second line such that the second layer is folded in a mountain shape at the second line by the strain exerted in the second layer in the predetermined region.

In the semiconductor device according to the present invention, the third layer, the second layer and the first layer are removed at the separating groove partially surrounding the predetermined region. Accordingly, the predetermined region enters a released state while being linked to the surrounding region only at the first line.

The respective lattice constants of the plurality of semiconductor layers in the second layer differ from one another. Accordingly, a strain due to the difference in the lattice constant is induced in the second layer. The groove having the first depth is formed at the first line, so that the second layer is folded in a valley shape at the first line so as to relieve the strain exerted in the second layer. The groove having the second depth is formed at the second line, so that the second layer is folded in a mountain shape at the second line so as to relieve the strain exerted in the second layer.

The second layer is thus automatically folded in a valley shape and a mountain shape so as to relieve the strain caused by the difference in the lattice constant among the plurality of semiconductor layers. Therefore, a semiconductor device folded in a valley shape and a mountain shape can be easily fabricated in a simple process.

The second layer may comprise a first semiconductor layer having a first lattice constant, a second semiconductor layer having a second lattice constant smaller than the first lattice constant, and a third semiconductor layer having a third lattice constant larger than the second lattice constant in this order.

A semiconductor device according to still another aspect of the present invention comprises a stacked structure of a plurality of semiconductor layers having different lattice constants respectively, and a groove having a predetermined depth being formed at a predetermined line such that the stacked structure is folded in a mountain shape at the line by a strain exerted in the stacked structure.

In the semiconductor device according to the present invention, the respective lattice constants of the plurality of semiconductor layers in the stacked structure differ from one another. Accordingly, a strain due to the difference in the lattice constant is induced in the stacked structure. The groove having the predetermined depth is formed at the predetermined line, so that the stacked structure is automatically folded in a mountain shape at the line so as to relieve the strain exerted in the stacked structure. Therefore, a semiconductor device folded in a valley shape can be easily fabricated in a simple process.

A semiconductor device according to still another aspect of the present invention comprises a stacked structure of a plurality of semiconductor layers having different lattice constants respectively, and a groove having a predetermined depth being formed at a predetermined line such that the stacked structure is folded in a valley shape at the line by a strain exerted in the stacked structure.

In the semiconductor device according to the present invention, the respective lattice constants of the plurality of semiconductor layers in the stacked structure differ from one another. Accordingly, a strain due to the difference in the lattice constant is induced in the stacked structure. The groove having the predetermined depth is formed at the predetermined line, so that the stacked structure is automatically folded in a valley shape at the line so as to relieve the strain exerted in the stacked structure. Therefore, a semiconductor device folded in a mountain shape can be easily fabricated in a simple process.

A semiconductor device according to still another aspect of the present invention comprises a stacked structure of a plurality of semiconductor layers having different lattice constants respectively, a groove having a first depth being formed at a first line such that the stacked structure is folded in a valley shape at the first line by a strain exerted in the stacked structure; and a groove having a second depth being formed at a second line such that the stacked structure is folded in a mountain shape at the second line by the strain exerted in the stacked structure.

In the semiconductor device according to the present invention, the respective lattice constants of the plurality of semiconductor layers differ from one another. Accordingly, a strain due to the difference in the lattice constant is induced in the stacked structure. The groove having the first depth is formed at the first line, so that the stacked structure is folded in a valley shape at the first line so as to relieve the strain exerted in the stacked structure. The groove having the second depth is formed at the second line, so that the stacked structure is automatically folded in a mountain shape at the second line so as to relieve the strain exerted in the stacked structure. Therefore, a semiconductor device folded in a valley shape and a mountain shape can be easily fabricated in a simple process.

A method of fabricating a semiconductor device according to still another aspect of the present invention comprises the steps of forming a first layer; forming on the first layer a second layer comprising a stacked structure of a plurality of semiconductor layers having different lattice constants respectively; forming a third layer on the second layer; forming a separating groove having a depth reaching to the first layer from the third layer so as to partially surround a predetermined region, and selectively removing the first layer in the predetermined region; forming a groove having a first depth at a first line such that the second layer is folded in a valley shape at the first line by a strain exerted in the second layer in the predetermined region; and forming a groove having a second depth at a second line such that the second layer is folded in a mountain shape at the second line by the strain exerted in the second layer in the predetermined region.

In the method of fabricating the semiconductor device according to the present invention, the third layer, the second layer and the first layer are removed at the separating groove partially surrounding the predetermined region. Accordingly, the predetermined region enters a released state while being linked to the surrounding region only at the first line.

The respective lattice constants of the plurality of semiconductor layers in the second layer differ from one another. Accordingly, a strain due to the difference in the lattice constant is induced in the second layer. The groove having the first depth is formed at the first line, so that the second layer is folded in a valley shape at the first line so as to relieve the strain exerted in the second layer. The groove having the second depth is formed at the second line, so that the second layer is folded in a mountain shape at the second line so as to relieve the strain exerted in the second layer.

The second layer is thus automatically folded in a valley shape and a mountain shape so as to relieve the strain caused by the difference in the lattice constant among the plurality of semiconductor layers. Therefore, a semiconductor device folded in a valley shape and a mountain shape can be easily fabricated in a simple process.

A method of fabricating a semiconductor device according to still another aspect of the present invention comprises the steps of forming a stacked structure of a plurality of semiconductor layers having different lattice constants respectively; and forming a groove having a predetermined depth at a predetermined line such that the stacked structure is folded in a mountain shape at the line by a strain exerted in the stacked structure.

In the method of fabricating the semiconductor device according to the present invention, the respective lattice constants of the plurality of semiconductor layers in the stacked structure differ from one another. Accordingly, a strain due to the difference in the lattice constant is induced in the stacked structure. The groove having the predetermined depth is formed at the predetermined line, so that the stacked structure is automatically folded in a mountain shape at the line so as to relieve the strain exerted in the stacked structure. Therefore, a semiconductor device folded in a valley shape can be easily fabricated in a simple process.

A method of fabricating a semiconductor device according to still another aspect of the present invention comprises the steps of forming a stacked structure of a plurality of semiconductor layers having different lattice constants respectively; and forming a groove having a predetermined depth at a predetermined line such that the stacked structure is folded in a valley shape at the line by a strain exerted in the stacked structure.

In the method of fabricating the semiconductor device according to the present invention, the respective lattice constants of the plurality of semiconductor layers differ from one another. Accordingly, a strain due to the difference in the lattice constant is induced in the stacked structure. The groove having the predetermined depth is formed at the predetermined line, so that the stacked structure is automatically folded in a mountain shape at the line so as to relieve the strain exerted in the stacked structure. Therefore, a semiconductor device folded in a mountain shape can be easily fabricated in a simple process.

A method of fabricating a semiconductor device according to still another aspect of the present invention comprises the steps of forming a stacked structure of a plurality of semiconductor layers having different lattice constants respectively; forming a groove having a first depth at a first line such that the stacked structure is folded in a valley shape at the first line by a strain exerted in the stacked structure; and forming a groove having a second depth different from the first depth at a second line such that the stacked structure is folded in a mountain shape at the second line by the strain exerted in the stacked structure.

In the method of fabricating the semiconductor device according to the present invention, the respective lattice constants of the plurality of semiconductor layers differ from one another. Accordingly, a strain due to the difference in the lattice constant is induced in the stacked structure. The groove having the first depth is formed at the first line, so that the stacked structure is automatically folded in a valley shape at the first line so as to relieve the strain exerted in the stacked structure. The groove having the second depth is formed at the second line, so that the stacked structure is automatically folded in a mountain shape at the second line so as to relieve the strain exerted in the stacked structure. Therefore, a semiconductor device folded in a valley shape and a mountain shape can be easily fabricated in a simple process.

The semiconductor device may include an arbitrary number of the above mountain shaped folds formed by folding the stacked structure at lines along arbitrary directions and an arbitrary number of the valley shaped folds formed by folding the stacked structure at lines along arbitrary directions in arbitrary order.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
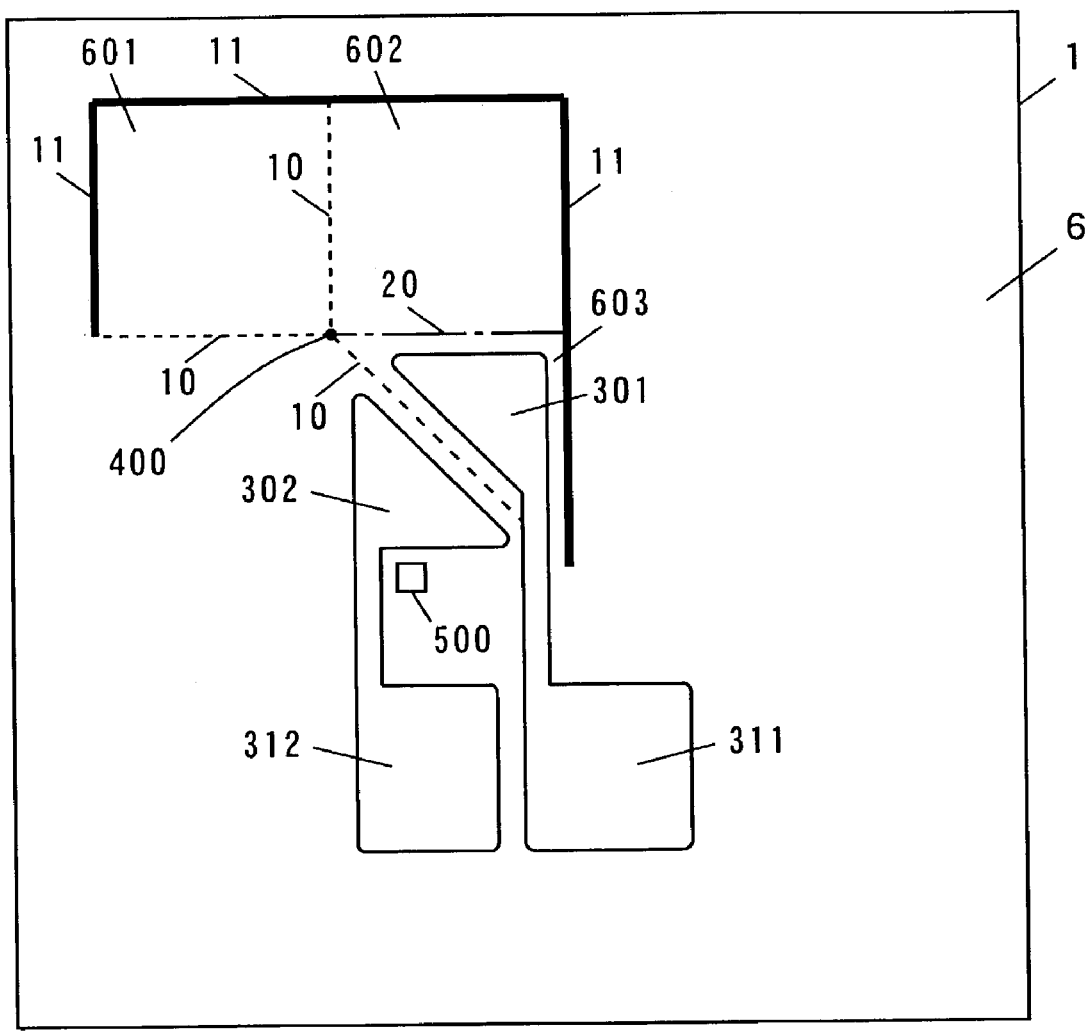
FIG. 1 is a schematic plan view showing a state where a reflecting layer has not stood yet in the steps of fabricating a reflecting device in an embodiment of the present invention.
Figure 2:
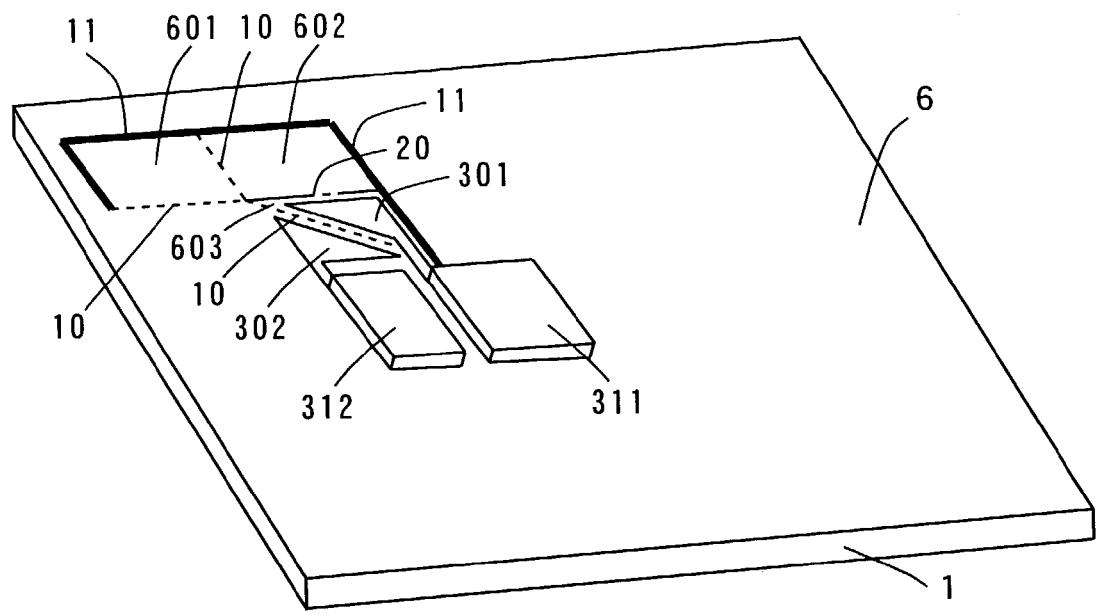
FIG. 2 is a schematic perspective view showing a state where a reflecting layer has not stood yet in the steps of fabricating a reflecting device in an embodiment of the present invention.
Figure 3:
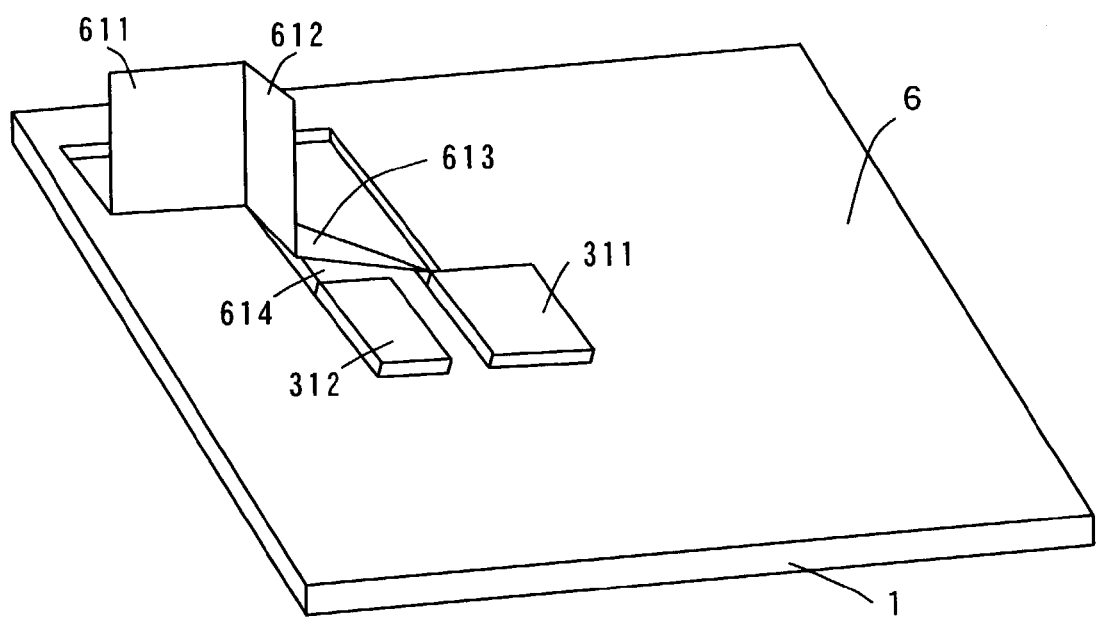
FIG. 3 is a schematic perspective view showing the step of causing a reflecting layer to stand in the steps of fabricating a reflecting device in an embodiment of the present invention.
Figure 4:
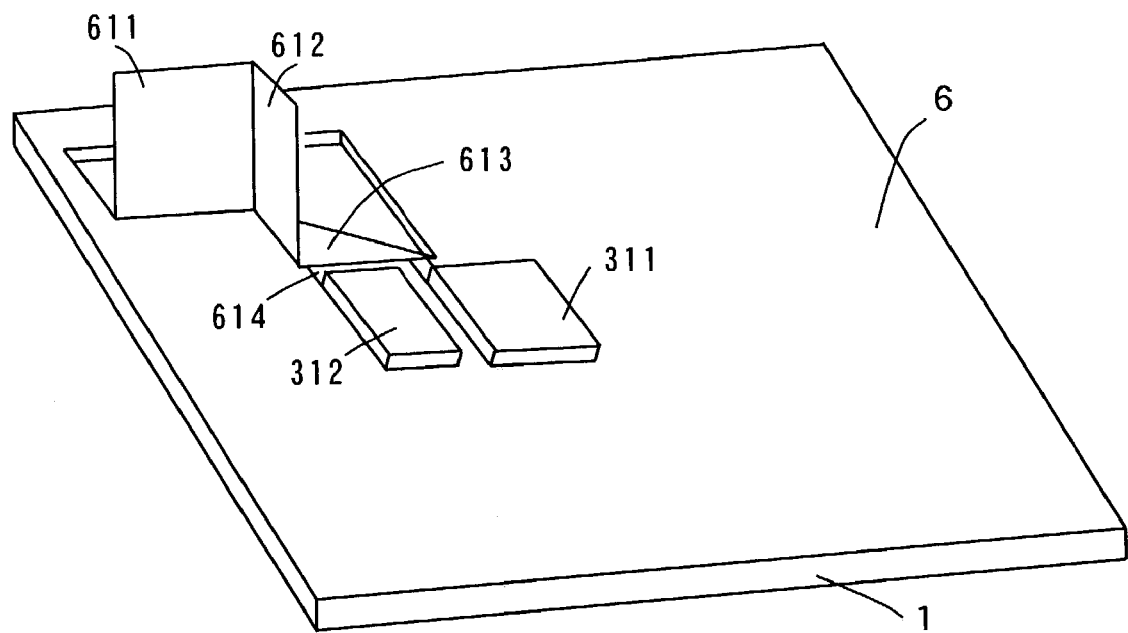
FIG. 4 is a schematic perspective view showing a state where a reflecting layer has already stood in the steps of fabricating a reflecting device in an embodiment of the present invention.
Figure 5:
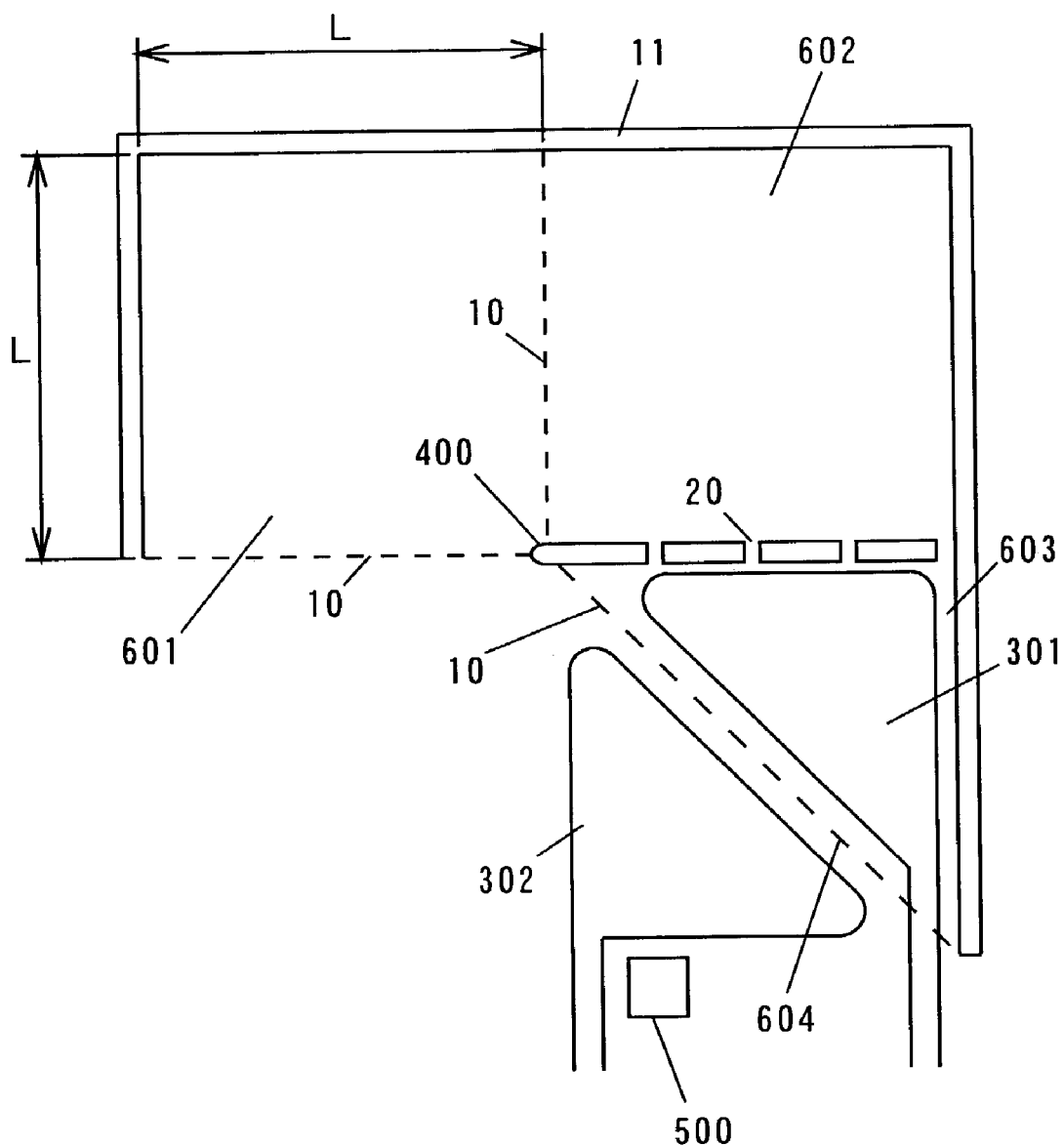
FIG. 5 is an enlarged view of first to third regions shown in FIG. 1.
Figure 6:
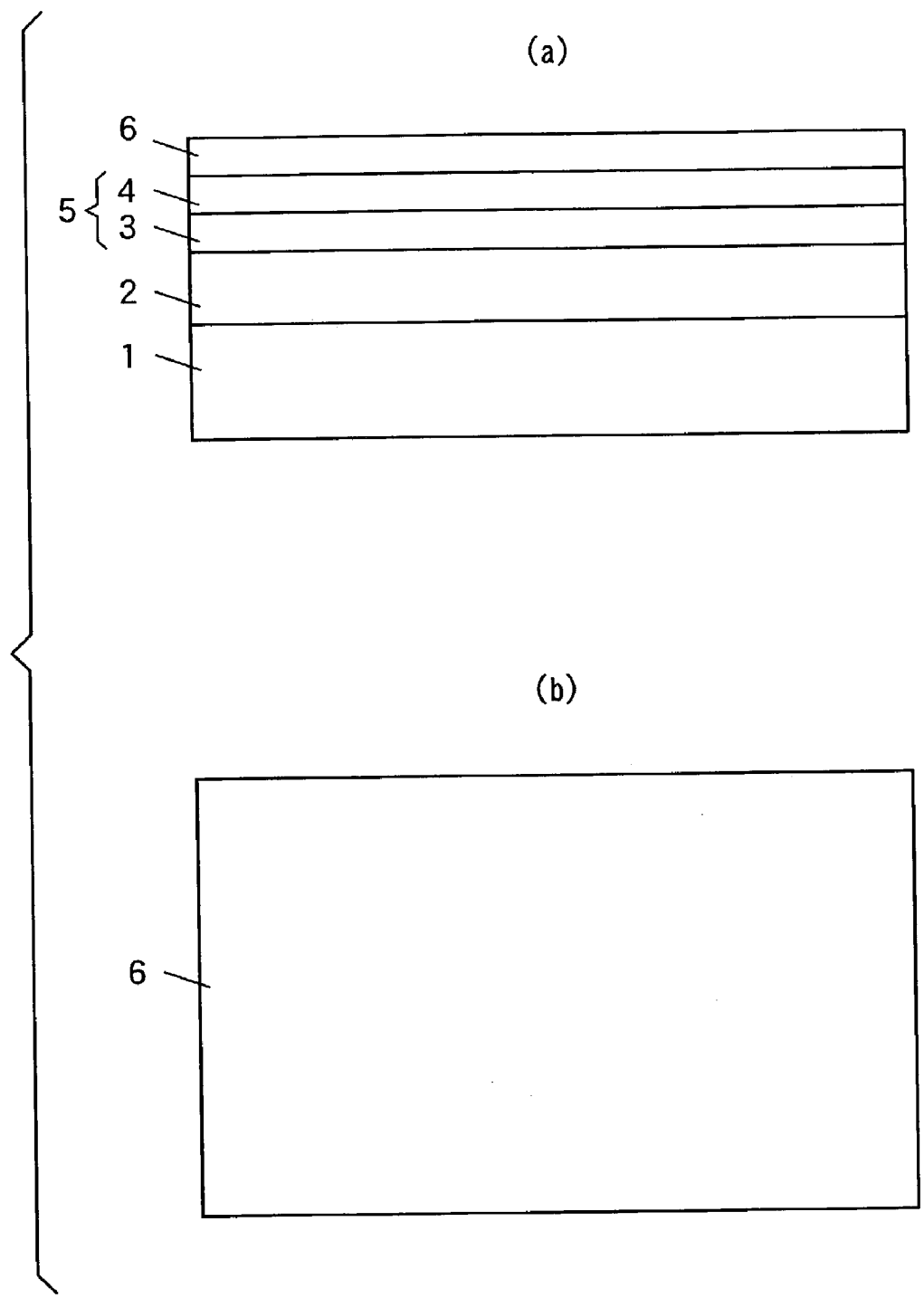
FIG. 6 is a diagram showing the steps of a method of fabricating a standing structure of a reflecting layer in the reflecting device shown in FIGS. 1 to 5.

FIGS. 1 to 4 are diagrams showing the steps of a method of fabricating a reflecting device in an embodiment of the present invention. FIG. 1 is a schematic plan view showing a state where a reflecting layer has not stood yet in the steps of fabricating the reflecting device, FIG. 2 is a schematic perspective view showing a state where the reflecting layer has not stood yet in the steps of fabricating the reflecting device, FIG. 3 is a schematic perspective view showing the step of causing the reflecting layer to stand in the steps of fabricating the reflecting device, and FIG. 4 is a schematic perspective view showing a state where the reflecting layer has already stood in the steps of fabricating the reflecting device. FIG. 5 is an enlarged view of first to third regions.

The reflecting device according to the present embodiment is a retroreflector that reflects light incident from an arbitrary direction to a direction parallel to the incident direction.

In FIGS. 1 and 2, a reflecting layer 6, described later, is formed on a surface of a substrate 1. The reflecting layer 6 is provided with a rectangular first region 601, a rectangular second region 602, and a third region 603 in the shape of an isosceles triangle. The first region 601 and the second region 602 are arranged such that they are adjacent to each other at their one sides, and the third region 603 is arranged such that it is adjacent to the second region 602 in one of its short sides.

A groove 10 indicated by a dotted line is formed along the one side of the first region 601, and a groove 10 indicated by a dotted line is formed along the side between the first region 601 and the second region 602. Further, a line 20 indicated by a one-dot and dash line is formed along the side between the second region 602 and the third region 603. Further, a groove 10 indicated by a dotted line is formed along the hypotenuse of the third region 603.

Separating grooves 11 indicated by thick solid lines are formed along the remaining two sides of the first region 601, the remaining two sides of the second region 602, and the other short side of the third region 603.

A triangular first electrode 301 is formed on the third region 603. A second electrode 302 is formed on the reflecting layer 6 so as to face the first electrode 301 with the groove 10 interposed therebetween. Further, electrode pads 311 and 312 respectively connected to the first electrode 301 and the second electrode 302 are formed on the reflecting layer 6. Further, a projection 500 is provided in the vicinity of the second electrode 302, as shown in FIG. 1.

As shown in FIG. 5, the length L of the one side of the first region 601 is approximately ten micrometers to several hundred micrometers. At the line 20 between the second region 602 and the third region 603, the reflecting layer 6 is intermittently removed such that folding in a mountain shape becomes easy. Further, at an intersection 400 of the three grooves 10 and the one line 20, the reflecting layer 6 is removed such that no stress is concentrated in folding.

The reflecting layers 6 in the first, second and third regions 601, 602 and 603 are separated from the reflecting layer 6 in the surrounding region by the separating groove 11. Further, the first region 601 is folded in a valley shape from the substrate 1 at the groove 10, the first region 601 and the second region 602 are folded in a valley shape from each other at the groove 10, the third region 603 is folded in a valley shape from the substrate 1 at the groove 10, and the second region 602 and the third region 603 are folded in a mountain shape from each other at the line 20. A valley-shaped deformation force at the groove 10 will be described later. Mountain-shaped deformation occurs at the line 20 utilizing the valley-shaped deformation force at the three grooves 10.

Consequently, the reflecting layer in the first region 601 (hereinafter referred to as first reflecting layer 611) and the reflecting layer in the second region 602 (hereinafter referred to as second reflecting layer 612) stand on the substrate 1, and the reflecting layer in the third region 603 (hereinafter referred to as third reflecting layer 613) faces the reflecting layer on the substrate 1 (hereinafter referred to as fourth reflecting layer 614), as shown in FIG. 3. Consequently, the first electrode 301 on the third reflecting layer 613 faces the second electrode 302 on the fourth reflecting layer 614.

Furthermore, when the third reflecting layer 613 is brought into contact with the projection 500 on the fourth reflecting layer 614, the first reflecting layer 611 and the second reflecting layer 612 stand perpendicularly to the fourth reflecting layer 614, and the first reflecting layer 611 and the second reflecting layer 612 make right angles with each other, as shown in FIG. 4. In this case, the first electrode 301 on the third reflecting layer 613 and the second electrode 302 on the fourth reflecting layer 604 are spaced apart from each other with a very small clearance therebetween by the projection 500 and are not brought into contact with each other.

In the reflecting device according to the present embodiment, the first, second and third reflecting layers 611 to 613 are folded while being related to one another, constituting a self-locking mechanism. Accordingly, the positional relationship thereamong is strictly defined. Consequently, three plane mirrors which are perpendicular to one another are easily and accurately constructed by the first reflecting layer 611, the second reflecting layer 612 and the fourth reflecting layer 614. Consequently, the reflecting device can accurately reflect light incident from an arbitrary direction to a direction parallel to the incident direction.

When a voltage is applied between the first electrode 301 and the second electrode 302 through the electrode pads 311 and 312, an electrostatic force is exerted between the first electrode 301 and the second electrode 302. By changing a voltage to be applied between the first electrode 301 and the second electrode 302, therefore, an angle which the third reflecting layer 613 and the fourth reflecting layer 614 make with each other can be changed. Consequently, angles which the first, second, third and fourth reflecting layers 611 to 614 make with each-other can be controlled.

When the angles which the first reflecting layer 611, the second reflecting layer 612 and the fourth reflecting layer 614 make with one another respectively deviate from 90 degrees, the incident light is not reflected to a direction parallel to the incident direction. That is, when no voltage is applied between the first electrode 301 and the second electrode 302, light emitted from a light source is reflected to the light source by the reflecting device. On the other hand, when a voltage is applied between the first electrode 301 and the second electrode 302, the light emitted from the light source is reflected to a direction different from the light source by the reflecting device. When this is utilized, the light emitted from the light source can be modulated and returned to the light source by controlling the voltage applied between the first electrode 301 and the second electrode 302. The reflecting device according to the present embodiment can be thus used as an optical modulator.

FIGS. 6, 7, 8 and 9 are diagrams showing the steps of a method of fabricating a standing structure of the reflecting layer in the reflecting device shown in FIGS. 1 to 5, where (a) is a schematic cross-sectional view, and (b) is a schematic plan view.

First, a sacrifice layer 2, a strain layer 5 and a reflecting layer 6 which are composed of AlGaAs are epitxially grown in this order on a substrate 1 composed of GaAs.

The sacrifice layer 2, the strain layer 5 and the reflecting layer 6 are formed using an epitaxial growth technique such as MBE (Molecular Beam Epitaxy), MOCVD (Metal Organic Chemical Vapor Deposition), or CVD (Chemical Vapor Deposition).

The strain layer 5 is constituted by an InGaAs layer 3 having a thickness of several nanometers to several ten nanometers and a GaAs layer 4 having a thickness of several nanometers to several ten nanometers. The lattice constant of the InGaAs layer 3 is larger than the lattice constant of the GaAs layer 4. Therefore, a strain due to the difference in the lattice constant is induced in the strain layer 5.

Furthermore, the reflecting layer 6 is composed of a distributed Bragg reflector film (hereinafter referred to as a DBR film). The DBR film has a stacked structure of AlGaAs and GaAs, as described later.

Figure 7:
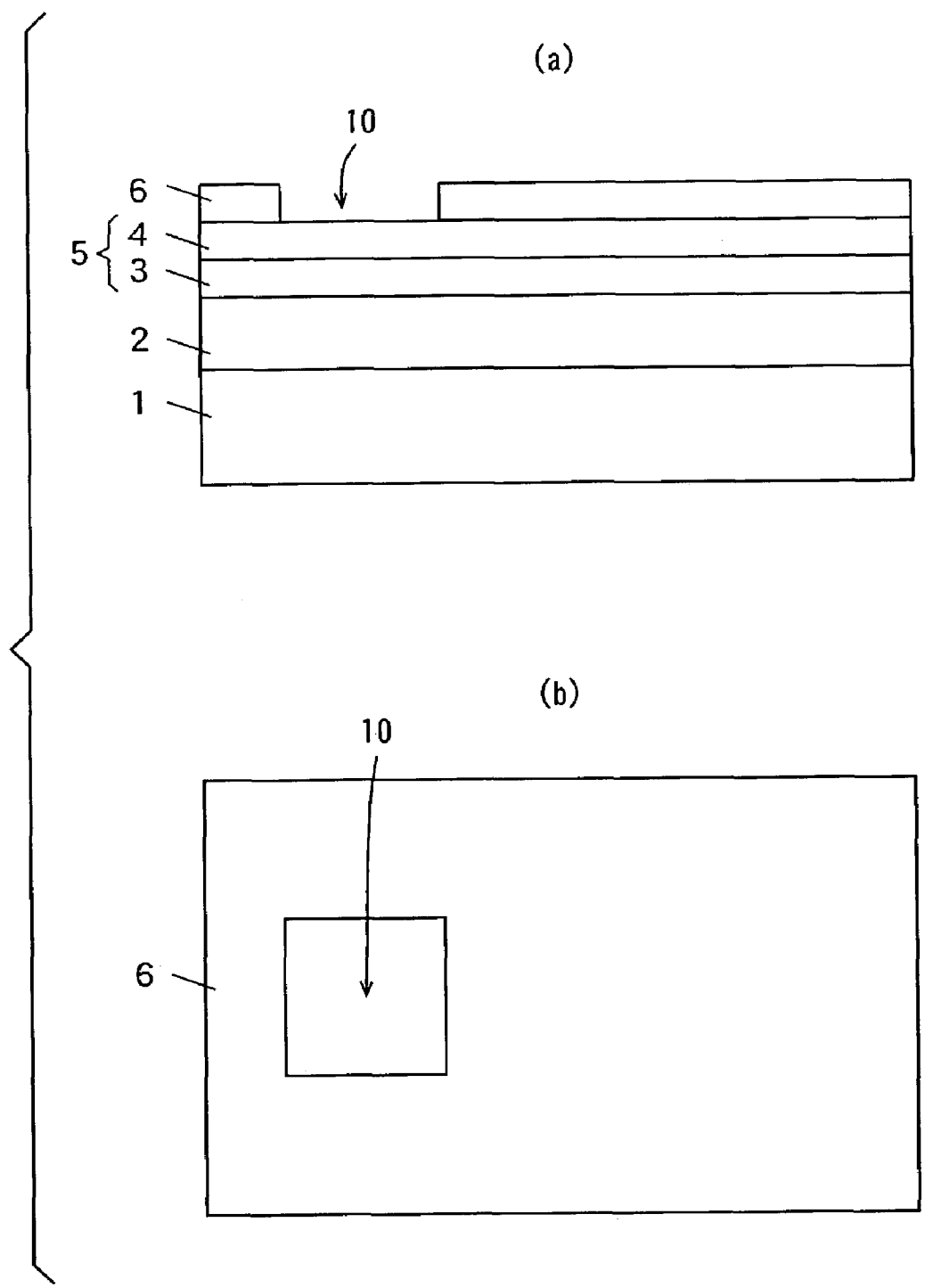
FIG. 7 is a diagram showing the steps of a method of fabricating a standing structure of a reflecting layer in the reflecting device shown in FIGS. 1 to 5.

As shown in FIG. 7, a groove 10 composed of a recess for defining a curved region is then formed in the reflecting layer 6 by photolithography and etching. As the etching, wet etching or RIE (Reactive Ion Etching) can be used.

Figure 8:
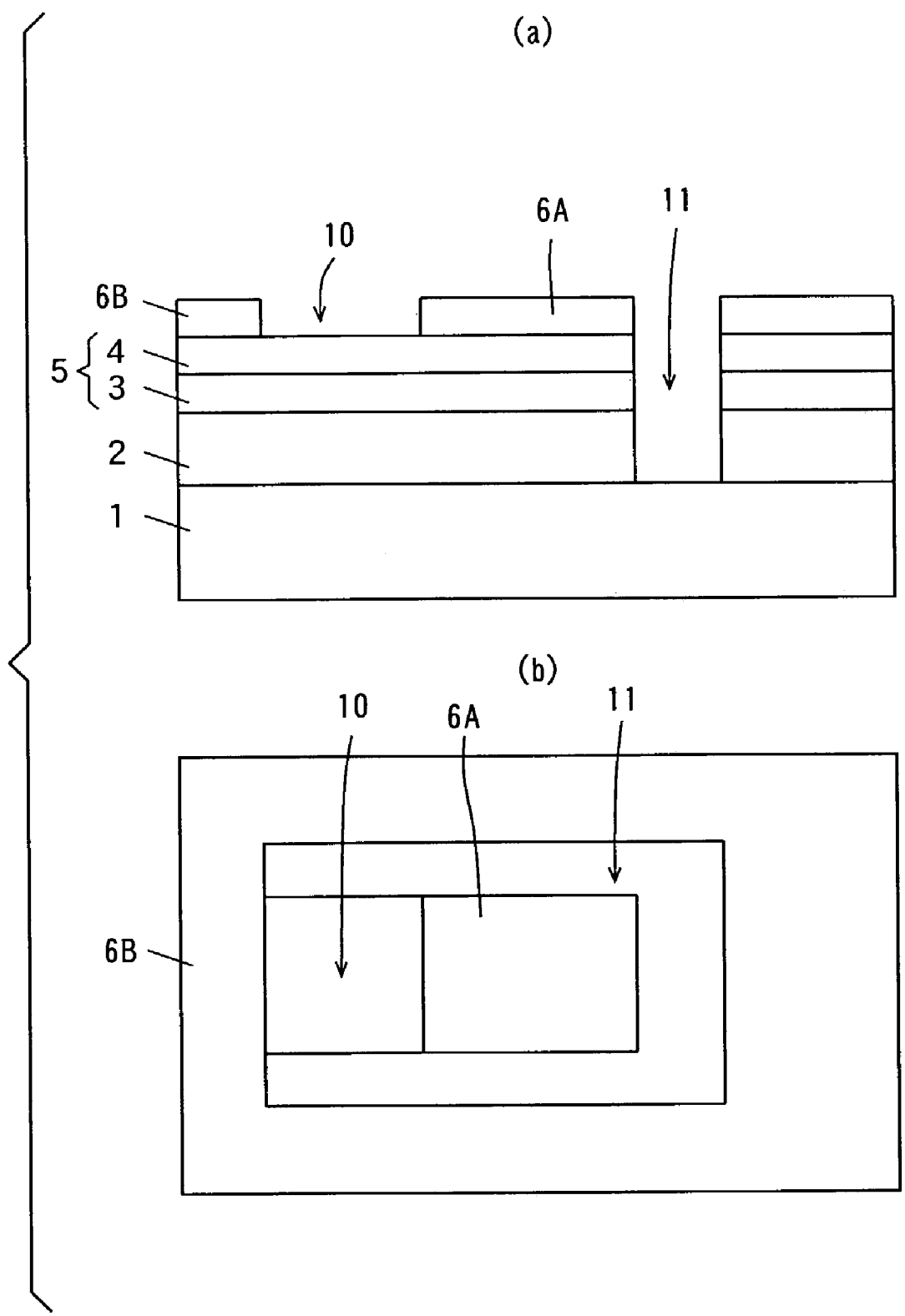
FIG. 8 is a diagram showing the steps of a method of fabricating a standing structure of a reflecting layer in the reflecting device shown in FIGS. 1 to 5.

The reflecting layer 6, the strain layer 5 and the sacrifice layer 2 are then removed so as to surround a predetermined region by photolithography and etching, to form a separating groove 11, as shown in FIG. 8. Consequently, the reflecting layer 6A surrounded by the separating groove 11 is separated from the surrounding reflecting layer 6B. In this case, the wet etching or the RIE is also used as the etching.

Figure 9:
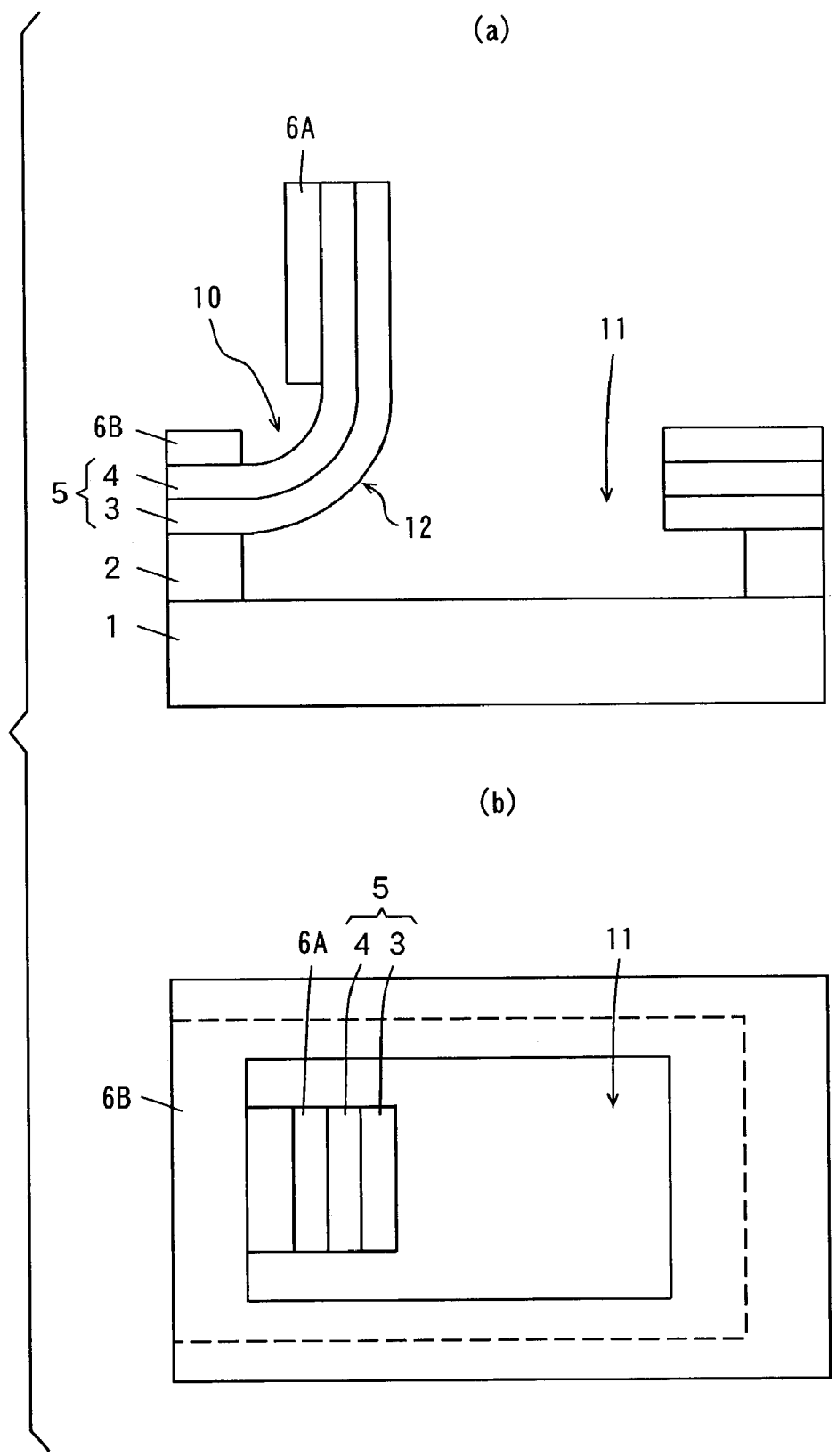
FIG. 9 is a diagram showing the steps of a method of fabricating a standing structure of a reflecting layer in the reflecting device shown in FIGS. 1 to 5.

Thereafter, the sacrifice layer 2 under the strain layer 5 is selectively etched by the wet etching, as shown in FIG. 9. As a result, the strain layer 5 is curved in the region 12 below the groove 10 so as to relieve the strain caused by the difference in the lattice constant between the InGaAs layer 3 and the GaAs layer 4 which constitute the strain layer 5. In this case, the thickness of the InGaAs layer 3, the thickness of the GaAs layer 4, and the In composition ratio in the InGaAs layer 3 are most suitably selected, thereby making it possible to cause the reflecting layer 6A to stand perpendicularly to the GaAs substrate 1.

For example, the thickness of the InGaAs layer 3 is set to 10 nm, and the thickness of the GaAs layer 4 is set to 10 nm. Further, when the In composition ratio X in the InGaAs layer 3 having a composition of $In_xGa_{1-x}As$ is set to 0.2, the strain layer 5 stands perpendicularly to the GaAs substrate 1.

The difference in the lattice constant between InGaAs and GaAs can be changed to approximately 7% by changing the In composition ratio in the InGaAs layer 3.

When it is assumed that the thickness t1 of the InGaAs layer 3 and the thickness t2 of the GaAs layer 4 are equal to each other, the following relationship holds among the thickness t1 of the InGaAs layer 3, the thickness t2 of the GaAs layer 4, the In composition ratio X in the InGaAs layer 3, and the radius of curvature R of the strain layer 5:

$$R=(\tfrac{2}{3})\cdot(a/\Delta a)\cdot d$$

Here, a denotes the lattice constant of GaAs, which is 5.6533 Å. Further, Δa denotes the difference between the lattice constant of $In_xGa_{1-x}As$ and the lattice constant of GaAs. The lattice constant of $In_{0.2}Ga_{0.8}As$ is 5.7343 Å. Further, d denotes the sum of the thickness t1 of the InGaAs layer 3 and the thickness t2 of the GaAs layer 4. When t1=t2=10 [m], d=20 [m]. In this example, R=0.944 [μm]. The length of a circular arc of a curved region is set to 1.483 μm.

Figure 10:
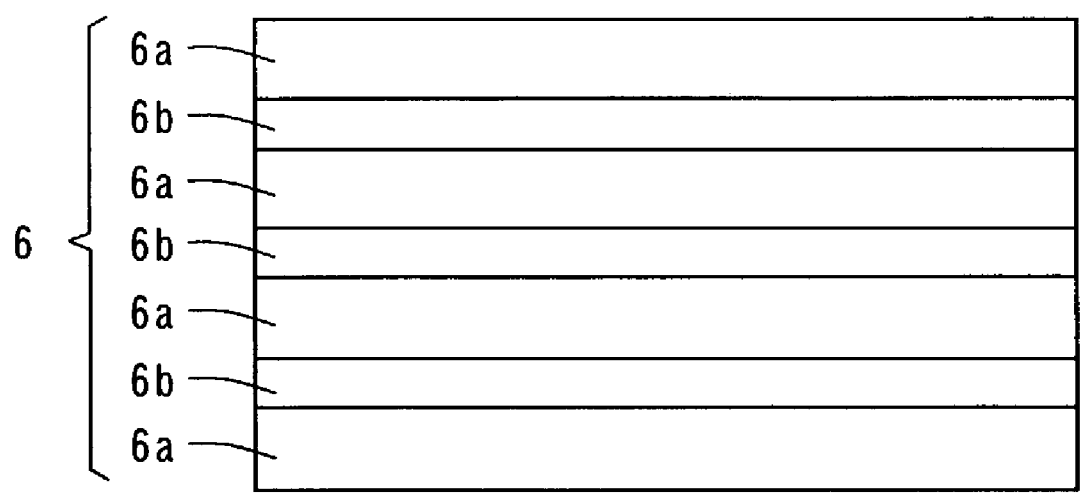
FIG. 10 is a schematic cross-sectional view showing the detailed structure of a reflecting layer.

FIG. 10 is a schematic cross-sectional view showing the detailed structure of the reflecting layer 6.

As shown in FIG. 10, the reflecting layer 6 has a stacked structure obtained by alternately stacking a plurality of AlGaAs layers 6a and a plurality of GaAs layers 6b. The respective repetition of the AlGaAs layer 6a and the GaAs layer 6b are 4 to 20.

The thickness $d_1$ of the AlGaAs layer 6a and the thickness $d_2$ of the GaAs layer 6b in the reflecting layer 6 are set, as expressed by the following equation:

$$d_1=\lambda/(4n_1) \tag{1}$$

$$d_2=\lambda/(4n_2) \tag{2}$$

Here, λ denotes an emission wavelength, and $n_1$ and $n_2$ respectively denote the refractive indexes of the AlGaAs layer 6a and the GaAs layer 6b.

Generally, the phase of an electromagnetic wave is not changed when the electromagnetic wave is incident on a material having a low refractive index to a material having a high refractive index, while being changed by π when it is incident on a material having a high refractive index to a material having a low refractive index. When the AlGaAs layer 6a and the GaAs layer 6b satisfy the foregoing equations (1) and (2), the phases of reflected waves in the respective layers are uniform, thereby obtaining a high reflectivity.

The reflecting layer 6 may be constructed by alternately stacking aluminum oxide layers obtained by oxidizing AlAs and AlGaAs layers.

The reflecting layer 6 composed of the DBR film standing perpendicularly to a surface of the substrate 1 composed of GaAs is thus fabricated.

Consequently, it is possible to fabricate the reflecting device shown in FIGS. 1 to 5 using the method of fabricating the standing structure shown in FIGS. 6 to 9.

The strain layer 5 may be heated by causing a current to flow through the strain layer 5. Consequently, the degree of the curvature of the strain layer 5 is adjusted, thereby making it possible to change the angle of the reflecting layer 6A. Further, the strain layer 5 can be easily curved by thermally expanding the InGaAs layer 3. In this case, n-type or p-type impurities are doped in order to provide conductivity to the InGaAs layer 3 in the steps shown in FIG. 1.

The angle of the reflecting layer 6A can be also changed to angles other than right angles by changing a voltage applied to the strain layer 5 or a current flowing through the strain layer 5.

The reflecting device according to the present embodiment can be fabricated easily and at low cost by a usual planar technique such as photolithography, etching, or epitaxial growth.

Figure 11:
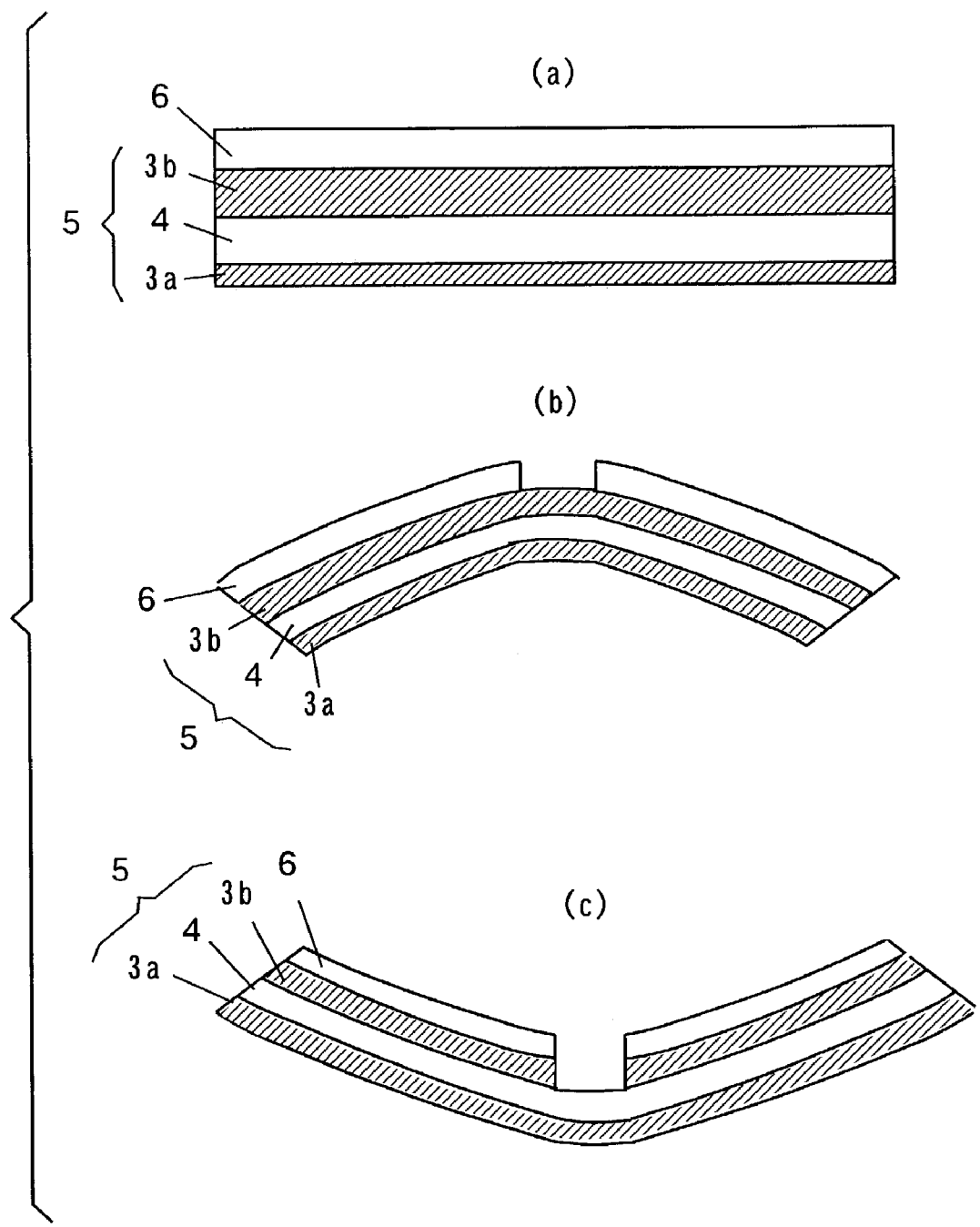
FIG. 11 is a schematic cross-sectional view showing another example of the structure of a strain layer.

FIG. 11 is a schematic cross-sectional view showing another example of the structure of the strain layer 5, where (a) illustrates a state where it is not folded, (b) illustrates a state where it is folded in a mountain shape, and (c) illustrates a state where it is folded in a valley shape.

As shown in FIG. 11(a), the strain layer 5 has a structure in which a GaAs layer 4 is interposed between a first InGaAs layer 3a and a second InGaAs layer 3b. The second InGaAs layer 3b has a thickness larger than the first InGaAs layer 3a. A reflecting layer 6 is formed on the second InGaAs layer 3b.

In this case, the first InGaAs layer 3a and the second InGaAs layer 3b respectively have lattice constants larger than the GaAs layer 4. Accordingly, the first InGaAs layer 3a is exerted so as to curve the GaAs layer 4 upward, and the second InGaAs layer 3b is exerted so as to curve the GaAs layer 4 downward. In this state, the reflecting layer 6 is formed on the second InGaAs layer 3b, whereby the strain layer 5 is not curved.

As shown in FIG. 11(b), when the reflecting layer 6 is etched such that the second InGaAs layer 3b is exposed, the second InGaAs layer 3b is exerted so as to curve the GaAs layer 4 downward because the thickness of the first InGaAs layer 3a is larger than the thickness of the second InGaAs layer 3b. Consequently, the reflecting layer 6 is folded in a mountain shape in an etched portion.

As shown in FIG. 11(c), when the reflecting layer 6 and the second InGaAs layer 3b are etched such that the GaAs layer 4 is exposed, the first InGaAs layer 3a is exerted so as to curve the GaAs layer 4 upward. Consequently, the reflecting layer 6 is folded in a valley shape in an etched portion.

In the reflecting device shown in FIGS. 1 to 5, the strain layer 5 shown in FIG. 11 is used, and the etching depth is adjusted, thereby making it possible to fold the reflecting layer 6 in a valley shape and a mountain shape.

Although in the reflecting device according to the present embodiment, the third reflecting layer 613 and the fourth reflecting layer 614 are respectively provided with the first electrode 301 and the second electrode 302, to change the respective angles of the first to fourth reflecting layers 611 to 614 by an electrostatic force, the present invention is not limited to the same. For example, it is also possible to change the respective angles of the first to fourth reflecting layers 611 to 614 by an electromagnetic force by respectively providing the third reflecting layer 613 and the fourth reflecting layer 614 with a first inductor and a second inductor.

Although in the above-mentioned embodiment, a stacked structure of the InGaAs layer and the GaAs layer is used as the strain layer 5, the present invention is not limited to the same. For example, a combination of various semiconductor layers respectively having different lattice constants can be used. Another stacked structure of Group III–V compound semiconductors and another stacked structure of Group II–VI compound semiconductors may be used as the strain layer 5. Further, a stacked structure of semiconductor layers containing Si (silicon) and Ge (germanium) may be used as the strain layer.

Although in the above-mentioned embodiment, a substrate composed of GaAs is used, another substrate such as a Si substrate may be used in consideration of materials for the sacrifice layer, the strain layer and the reflecting layer.

Although in the above-mentioned embodiment, AlGaAs is used as the material for the sacrifice layer, the present invention is not limited to the same. For example, another material may be used in consideration of selective etching.

Furthermore, the material for the reflecting layer is not limited to that in the above-mentioned embodiment. For example, arbitrary materials may be used depending on applications of the reflecting layer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reflecting device comprising in the following order:
   a substrate;
   a first layer;
   a second layer; and
   a third layer,
   said second layer comprising a stacked structure of a plurality of semiconductor layers having different lattice constants respectively,
   said third layer comprising a reflecting layer,
   said third layer having a first line, a second line, a third line and a fourth line which meet at first, second and third angles in this order at a predetermined point, and including a first region having two sides along said first line and said second line, a second region having two sides along said second line and said third line, and a third region having two sides along said third line and said fourth line,
   a separating groove having a depth reaching to said first layer from said third layer so as to surround said first, second and third regions in a portion excluding said first, second, third and fourth lines, and said first layer in said first, second and third regions being selectively removed,
   said second layer being folded in a valley shape at said first, second and fourth lines and folded in a mountain shape at said third line by a strain exerted in said second layer, said first and second regions standing on said third layer on said substrate, said third region facing said third layer on said substrate, and said first and second regions making a predetermined angle with each other.

2. The reflecting device according to claim 1, wherein said first angle is 90 degrees, said second angle is 90 degrees, and said third angle is 45 degrees.

3. The reflecting device according to claim 1, wherein said third layer is removed at said first, second and fourth lines.

4. The reflecting device according to claim 1, wherein said second layer comprises a first semiconductor layer having a first lattice constant, and a second semiconductor layer having a second lattice constant smaller than said first lattice constant.

5. The reflecting device according to claim 1, wherein said first layer, said second layer and said third layer are intermittently removed at said third line.

6. The reflecting device according to claim 1, wherein said second layer comprises a first semiconductor layer having a first lattice constant, a second semiconductor layer having a second lattice constant smaller than said first lattice constant, and a third semiconductor layer having a third lattice constant larger than said second lattice constant, and said third layer at said first, second and fourth lines and said third semiconductor layer are removed such that said second layer is folded in a valley shape at said first, second and fourth lines, and said third layer is removed at said third line such that said second layer is folded in a mountain shape at said third line.

7. The reflecting device according to claim 1, wherein said first layer, said second layer and said third layer are removed at said predetermined point.

8. The reflecting device according to claim 1, further comprising a driving part for changing the respective angles of said first region and said second region which stand on said third layer on said substrate.

9. The reflecting device according to claim 8, wherein said driving part exerts an electrostatic force or an electromagnetic force between said third region and said third layer on said substrate.

* * * * *